(12) United States Patent
Jang et al.

(10) Patent No.: US 9,054,844 B2
(45) Date of Patent: Jun. 9, 2015

(54) METHOD FOR DETERMINING MODULATION ORDER OF UPLINK CONTROL INFORMATION IN MULTIPLE ANTENNA WIRELESS COMMUNICATION SYSTEM AND DEVICE THEREFOR

(75) Inventors: Jiwoong Jang, Anyang-si (KR); Jaehoon Chung, Anyang-si (KR); Hyunwoo Lee, Anyang-si (KR); Hyunsoo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 47 days.

(21) Appl. No.: 13/698,949

(22) PCT Filed: May 12, 2011

(86) PCT No.: PCT/KR2011/003506
§ 371 (c)(1),
(2), (4) Date: Nov. 19, 2012

(87) PCT Pub. No.: WO2011/145832
PCT Pub. Date: Nov. 24, 2011

(65) Prior Publication Data
US 2013/0064228 A1    Mar. 14, 2013

Related U.S. Application Data

(60) Provisional application No. 61/346,469, filed on May 20, 2010, provisional application No. 61/372,866, filed on Aug. 12, 2010.

(51) Int. Cl.
*H04W 72/00* (2009.01)
*H04L 5/00* (2006.01)
(Continued)

(52) U.S. Cl.
CPC ............ *H04L 5/0053* (2013.01); *H04L 5/0057* (2013.01); *H04W 52/146* (2013.01);
(Continued)

(58) Field of Classification Search
CPC ................... H04B 1/707; H04B 2201/70701; H04B 7/2628
USPC .......................................................... 370/335
See application file for complete search history.

(56) References Cited

U.S. PATENT DOCUMENTS 7,227,874 B2 * 6/2007 Kim et al. .................... 370/468
7,468,967 B2 * 12/2008 Bossler et al. ............... 370/335
(Continued)

FOREIGN PATENT DOCUMENTS

KR   10-2007-0107577 A   11/2007
KR   10-2007-0119958 A   12/2007
(Continued)

OTHER PUBLICATIONS

Ghosh, Amitava; Xiao, Weimin; Ratasuk, Rapeepat; Classon, Brian; Nangia, Vijay; Love, Robert; Schwent, Dale; Wilson, David; Uplink Control Channel Design for 3GPP LTE, The 18th Annual IEEE International Symposium on Personal, Indoor and Mobile Radio Communications (PIMRC'07).*

*Primary Examiner* — Melvin Marcelo
*Assistant Examiner* — Peter Solinsky
(74) *Attorney, Agent, or Firm* — Birch, Stewart, Kolasch & Birch, LLP

(57) ABSTRACT

Disclosed is a method for allowing a terminal equipped with multiple antennas to transmit uplink control information in a wireless communication system. More specifically, the method comprises the steps of generating a plurality of codewords by using data information and said uplink control information; modulating each of the generated codewords based on predetermined modulation orders; and transmitting the modulated signals to a base station through said multiple antennas, wherein first uplink control information of said uplink control information is mapped into a particular codeword among the plurality of codewords, second uplink control information is repeated and mapped for each of the plurality of codewords, and a modulation order for the second uplink control information is the modulation order corresponding to said particular codeword.

16 Claims, 16 Drawing Sheets

(51) Int. Cl.

| | | |
|---|---|---|
| *H04W 52/14* | (2009.01) | |
| *H04B 7/04* | (2006.01) | |
| *H04B 7/06* | (2006.01) | |
| *H04L 1/00* | (2006.01) | |
| *H04L 1/08* | (2006.01) | |
| *H04W 72/04* | (2009.01) | |
| *H04L 1/12* | (2006.01) | |

(52) U.S. Cl.
CPC ......... *H04L5/0023* (2013.01); *H04W 72/0413* (2013.01); *H04B 7/0404* (2013.01); *H04B 7/0623* (2013.01); *H04B 7/063* (2013.01); *H04B 7/0632* (2013.01); *H04L 1/0003* (2013.01); *H04L 1/0073* (2013.01); *H04L 1/08* (2013.01); *H04L 2001/125* (2013.01)

(56) References Cited

U.S. PATENT DOCUMENTS

| | | | |
|---|---|---|---|
| 7,792,223 B2* | 9/2010 | Li .................................. | 375/341 |
| 7,889,703 B2* | 2/2011 | Yang et al. .................... | 370/335 |
| 7,916,775 B2* | 3/2011 | Kim et al. ..................... | 375/220 |
| 8,644,409 B2* | 2/2014 | Gorokhov et al. ............. | 375/267 |
| 8,761,286 B2* | 6/2014 | Seo et al. ...................... | 375/267 |
| 2006/0245455 A1 | 11/2006 | Bossler et al. | |
| 2008/0095252 A1 | 4/2008 | Kim et al. | |
| 2008/0151853 A1* | 6/2008 | Pajukoski et al. ............. | 370/342 |
| 2008/0298511 A1* | 12/2008 | Ryoo et al. ................... | 375/340 |
| 2009/0129330 A1* | 5/2009 | Kim et al. ..................... | 370/329 |
| 2010/0034114 A1* | 2/2010 | Kim et al. ..................... | 370/252 |
| 2010/0054353 A1* | 3/2010 | Roh et al. ...................... | 375/260 |
| 2010/0118841 A1* | 5/2010 | Kalhan ........................... | 370/338 |
| 2010/0239040 A1* | 9/2010 | Beluri et al. ................... | 375/267 |
| 2010/0309861 A1* | 12/2010 | Gorokhov et al. ............. | 370/329 |
| 2011/0002309 A1* | 1/2011 | Park et al. ...................... | 370/335 |
| 2011/0051824 A1 | 3/2011 | Kim et al. | |
| 2011/0122846 A1* | 5/2011 | Yu et al. ........................ | 370/335 |
| 2011/0280222 A1* | 11/2011 | Nam et al. ..................... | 370/335 |
| 2011/0299383 A1* | 12/2011 | Ko et al. ........................ | 370/210 |
| 2012/0063400 A1* | 3/2012 | Papasakellariou et al. ... | 370/329 |
| 2012/0113831 A1* | 5/2012 | Pelletier et al. ............... | 370/252 |
| 2012/0127950 A1* | 5/2012 | Chung et al. .................. | 370/329 |
| 2012/0320852 A1* | 12/2012 | Seo et al. ....................... | 370/329 |
| 2013/0028192 A1* | 1/2013 | Cheng et al. ................... | 370/328 |
| 2013/0058305 A1* | 3/2013 | Jang et al. ...................... | 370/329 |
| 2013/0064228 A1* | 3/2013 | Jang et al. ...................... | 370/335 |
| 2014/0050274 A1* | 2/2014 | Kotecha et al. ................ | 375/267 |
| 2014/0119323 A1* | 5/2014 | Chung et al. .................. | 370/329 |
| 2014/0204878 A1* | 7/2014 | Jang et al. ...................... | 370/329 |

FOREIGN PATENT DOCUMENTS

| | | |
|---|---|---|
| KR | 10-2008-0065493 A | 7/2008 |
| KR | 10-2009-0121185 A | 11/2009 |
| KR | 10-2010-0019946 A | 2/2010 |

\* cited by examiner

FIG. 5
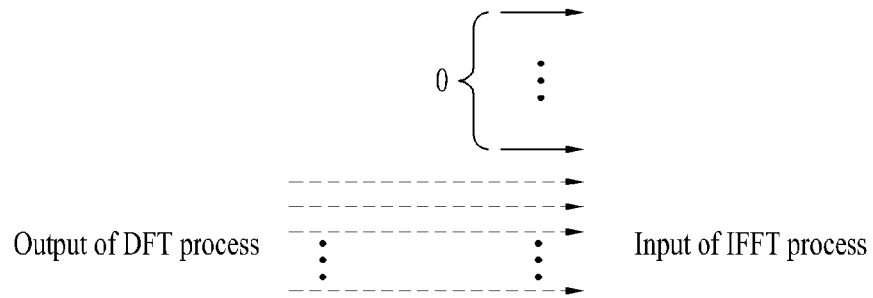
(a)
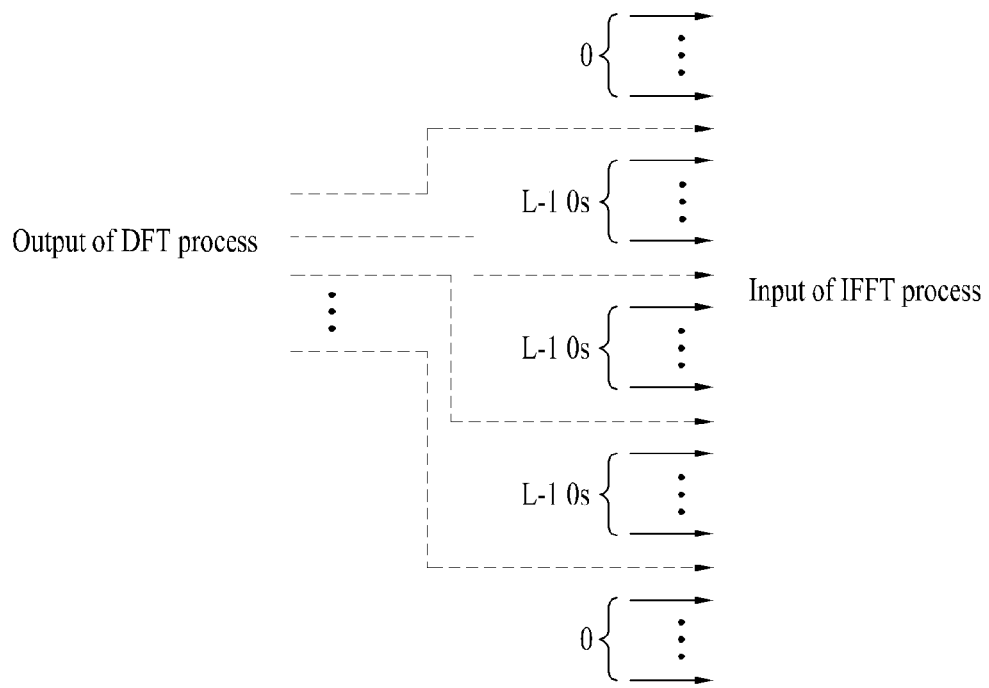
(b)

METHOD FOR DETERMINING MODULATION ORDER OF UPLINK CONTROL INFORMATION IN MULTIPLE ANTENNA WIRELESS COMMUNICATION SYSTEM AND DEVICE THEREFOR

CROSS REFERENCE TO RELATED APPLICATIONS

This application is the National Phase of PCT/KR2011/003506 filed on May. 12, 2011, which claims priority under 35 U.S.C. 119(e) to U.S. Provisional Application No. 61/346,469 filed on May. 20, 2010 and U.S. Provisional Application No. 61/372,866 filed on Aug. 12, 2010, all of which are hereby expressly incorporated by reference into the present application.

TECHNICAL FIELD

The present invention relates to a wireless communication system, and more particularly, to a method for determining a modulation order of uplink control information in a multi-antenna wireless communication system and an apparatus for the same.

BACKGROUND ART

In a mobile communication system, a user equipment may receive information from a base station through a downlink, and may also transmit information through an uplink. Examples of information transmitted from and received by the user equipment include data and various kinds of control information. Various physical channels exist depending on types of information transmitted from or received by the user equipment.

FIG. 1 is a diagram illustrating physical channels used in a $3^{rd}$ generation partnership project long term evolution (3GPP) system, which is an example of a mobile communication system, and a general method for transmitting a signal using the physical channels.

A user equipment performs initial cell search such as synchronizing with a base station when it newly enters a cell or the power is turned on, at step S101. To this end, the user equipment may synchronize with the base station by receiving a primary synchronization channel (P-SCH) and a secondary synchronization channel (S-SCH) from the base station, and may acquire information of cell ID, etc. Afterwards, the user equipment may acquire broadcast information within a cell by receiving a physical broadcast channel from the base station. Meanwhile, the user equipment may identify the channel status of a downlink by receiving a downlink reference signal (DL RS) in the initial cell search step.

The user equipment which has finished the initial cell search may acquire more detailed system information by receiving a physical downlink control channel (PDCCH) and a physical downlink control channel (PDSCH) based on the physical downlink control channel information, at step S102.

Meanwhile, the user equipment that has not accessed the base station may perform a random access procedure (RACH) for the base station, such as step S103 to S106, to completely access the base station. To this end, the user equipment may transmit a preamble of a specific sequence through a random physical random access channel (PRACH) (S103), and may receive a response message to the random access through the PDCCH and a PDSCH corresponding to the PDCCH (S104). In case of contention based random access except for handover, a contention resolution procedure such as transmission (S105) of additional PRACH and reception (S106) of the PDCCH and the PDSCH corresponding to the PDCCH may be performed.

The user equipment which has performed the aforementioned steps may receive the PDCCH/PDSCH (S107) and transmit a physical uplink shared channel (PUSCH) and a physical uplink control channel (PUCCH) (S108), as a general procedure of transmitting uplink/downlink signals.

FIG. 2 is a diagram illustrating a signal processing procedure for transmitting an uplink signal from a user equipment.

A scrambling module 210 of a user equipment may scramble transmitting signals by using a user equipment specific scrambling signal to transmit an uplink signal. The scrambled signals are input to a modulation mapper 220 and are modulated into complex symbols by a binary phase shift keying (BPSK) mode, a quadrature phase shift keying (QPSK) mode, or a 16 quadrature amplitude modulation (QAM) mode depending on types of the transmitting signals and/or the channel status. Afterwards, the modulated complex symbols are processed by a conversion precoder 230 and then input to a resource element mapper 240. The resource element mapper 240 may map the complex symbols into time-frequency resource elements to be used for actual transmission. In this way, the processed signals may be transmitted to the base station through an antenna after passing through an SC-FDMA signal generator 250.

FIG. 3 is a diagram illustrating a signal processing procedure for transmitting a downlink signal from a base station.

In the 3GPP LTE system, the base station may transmit one or more codewords to the downlink. Accordingly, one or more codewords may be processed as complex symbols through a scrambling module 301 and a modulation mapper 302 in the same manner as the uplink of FIG. 2. Afterwards, the complex symbols are mapped into a plurality of layers by a layer mapper 303, wherein each layer may be multiplied by a predetermined precoding matrix selected by a precoding module 304 depending on the channel status and then may be allocated to each transmitting antenna. The transmitting signals per antenna, which are processed as above, are mapped into time-frequency resource elements to be used for transmission by a resource element mapper 305. Afterwards, the processed signals may be transmitted through each antenna after passing through an OFDM signal generator 306.

If the user equipment transmits a signal to the uplink in the mobile communication system, a peak-to-average-ratio (PAPR) ratio may cause a problem as compared with that the base station transmits a signal to the downlink. Accordingly, as described with reference to FIG. 2 and FIG. 3, SC-FDMA (Single Carrier-Frequency Division Multiple Access) system is used for uplink signal transmission unlike OFDMA system used for downlink signal transmission.

FIG. 4 is a diagram illustrating an SC-FDMA system for uplink signal transmission and an OFDMA system for downlink signal transmission in a mobile communication system.

Each of a user equipment for uplink signal transmission and a base station for downlink signal transmission includes a serial-to-parallel converter 401, a subcarrier mapper 403, an M-point IDFT module 404, and a cyclic prefix (CP) addition module 406.

However, the user equipment for signal transmission based on the SC-FDMA system further includes a parallel-to-serial converter 405 and an N-point DFT module 402. The N-point DFT module 402 offsets IDFT processing effect of the M-point IDFT module 404 as much as a predetermined portion, whereby the transmitting signals have single carrier properties.

FIG. 5 is a diagram illustrating a signal mapping system on a frequency domain for satisfying single carrier properties in the frequency domain. In FIG. 5, (a) illustrates a localized mapping system, and (b) illustrates a distributed mapping system. In the current 3GPP LTE system, the localized mapping system is defined.

Meanwhile, a clustered SC-FDMA which is a corrected type of SC-FDMA will be described. The clustered SC-FDMA divides DFT process output samples into sub-groups in sequentially mapping subcarriers between DFT process and IFFT process, and maps the DFT process output samples into subcarrier regions, which are spaced apart from one another per sub-group in an IFFT sample input module. The clustered SC-FDMA may include a filtering process and a cyclic extension process as the case may be.

At this time, the sub-group may be designated as a cluster. The cyclic extension process means that a guard interval longer than maximum delay spread of a channel is inserted between contiguous symbols to avoid inter-symbol interference while each symbol of subcarriers is being transmitted through a multi-path channel.

DISCLOSURE

Technical Problem

An object of the present invention devised to solve the conventional problem is to provide a method for determining a modulation order of uplink control information in a multi-antenna wireless communication system and an apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, a method for transmitting uplink control information from a user equipment having multiple antennas in a wireless communication system comprises the steps of generating a plurality of codewords by using data information and the uplink control information; modulating each of the generated codewords based on predetermined modulation orders; and transmitting the modulated signals to a base station through the multiple antennas, wherein first uplink control information of the uplink control information is mapped into a specific one of the plurality of codewords, second uplink control information is repeated and mapped for each of the plurality of codewords, and a modulation order for the second uplink control information is the modulation order corresponding to the specific codeword.

In this case, the first uplink control information is a channel quality indicator (CQI), and the second uplink control information is at least one of acknowledgement/negative acknowledgement (ACK/NACK) and rank indicator (RI).

In another aspect of the present invention, a method for transmitting uplink control information from a user equipment having multiple antennas in a wireless communication system comprises the steps of generating a plurality of codewords by using data information and the uplink control information; modulating each of the generated codewords based on predetermined modulation orders; and transmitting the modulated signals to a base station through the multiple antennas, wherein the uplink control information is repeated and mapped for each of the plurality of codewords, and a modulation order for the uplink control information is the minimum modulation order of the modulation orders configured for each of the plurality of codewords. In this case, it is preferable that the uplink control information is at least one of acknowledgement/negative acknowledgement (ACK/NACK) and rank indicator (RI).

In still another aspect of the present invention, a user equipment having multiple antennas in a wireless communication system comprises a wireless communication module for transmitting and receiving a signal to and from a base station by using multiple antennas; and a processor for processing the signal, wherein the processor generates a plurality of codewords by using data information and the uplink control information and modulates each of the generated codewords based on predetermined modulation orders, and a channel quality indicator (CQI) of the uplink control information is mapped into a specific one of the plurality of codewords, acknowledgement/negative acknowledgement (ACK/NACK) or rank indicator (RI) of the uplink control information is repeated and mapped for each of the plurality of codewords, and a modulation order for at least one of the ACK/NACK and the RI is the modulation order corresponding to the specific codeword.

In further still another aspect of the present invention, a user equipment having multiple antennas in a wireless communication system comprises a wireless communication module for transmitting and receiving a signal to and from a base station by using multiple antennas; and a processor for processing the signal, wherein the processor generates a plurality of codewords by using data information and the uplink control information and modulates each of the generated codewords based on predetermined modulation orders, and the uplink control information is repeated and mapped for each of the plurality of codewords, and a modulation order for the uplink control information is the minimum modulation order of the modulation orders configured for each of the plurality of codewords. Preferably, the uplink control information is at least one of acknowledgement/negative acknowledgement (ACK/NACK) and rank indicator (RI).

In this case, the predetermined modulation orders are configured by the base station for data information included in each of the codewords.

Advantageous Effects

According to the embodiments of the present invention, the user equipment may efficiently determine a modulation order of uplink control information in a multi-antenna wireless communication system.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a diagram illustrating a signal mapping system on a frequency domain for satisfying single carrier properties in the frequency domain;

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to a system that uses a plurality of orthogonal subcarriers. For convenience, although the present invention will be described based on the IEEE 802.16 system, the IEEE 802.16 system is only exemplary, and the present invention may be applied to various wireless communication systems including a 3rd generation partnership project (3GPP) system.

Also, specific terminologies hereinafter used in the embodiments of the present invention are provided to assist understanding of the present invention, and various modifications may be made in the specific terminologies within the range that they do not depart from technical spirits of the present invention.

Figure 1:
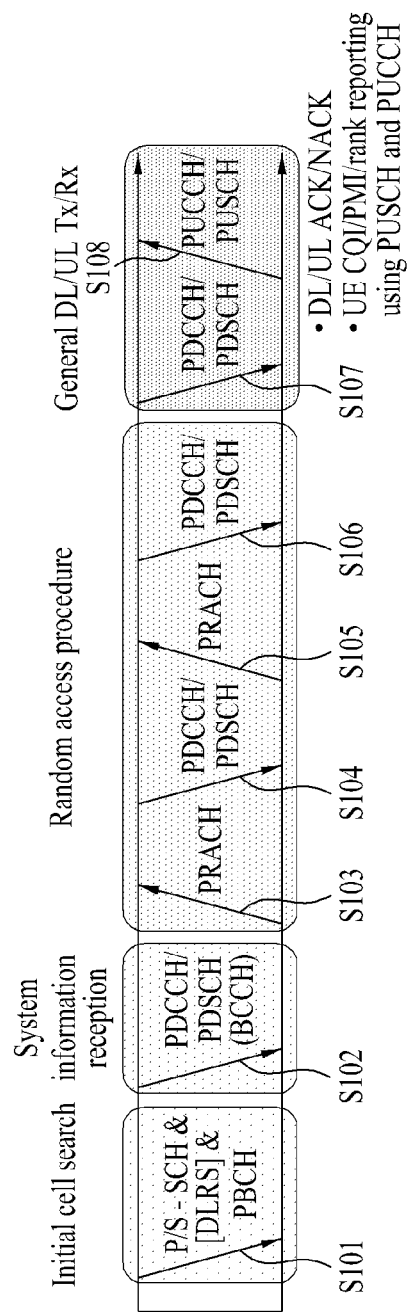
FIG. 1 is a diagram illustrating physical channels used in a 3$^{rd}$ generation partnership project long term evolution (3GPP) system, which is an example of a mobile communication system, and a general method for transmitting a signal using the physical channels.
Figure 2:
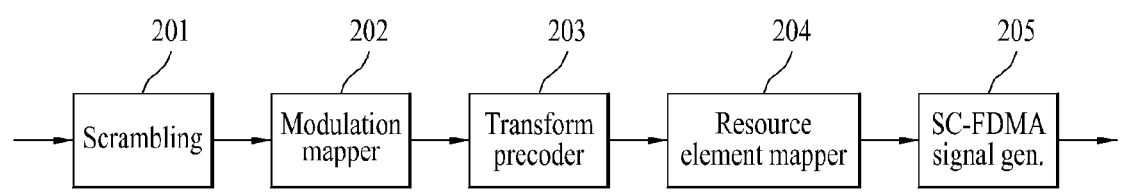
FIG. 2 is a diagram illustrating a signal processing procedure for transmitting an uplink signal from a user equipment.
Figure 3:
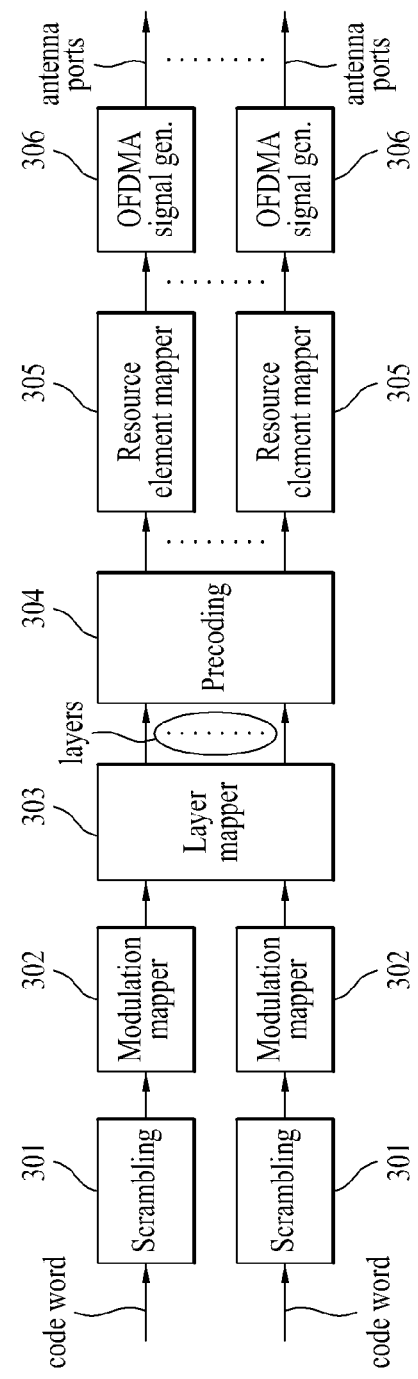
FIG. 3 is a diagram illustrating a signal processing procedure for transmitting a downlink signal from a base station.
Figure 4:
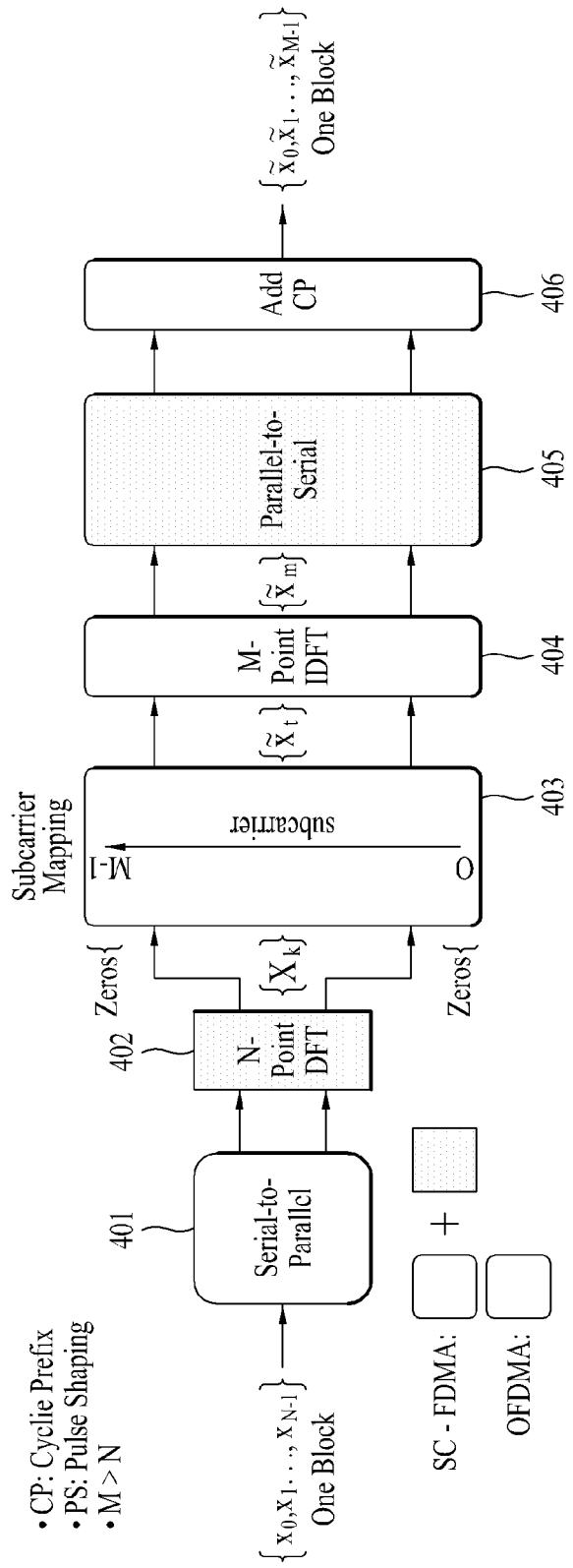
FIG. 4 is a diagram illustrating an SC-FDMA system for uplink signal transmission and an OFDMA system for downlink signal transmission in a mobile communication system.
Figure 6:
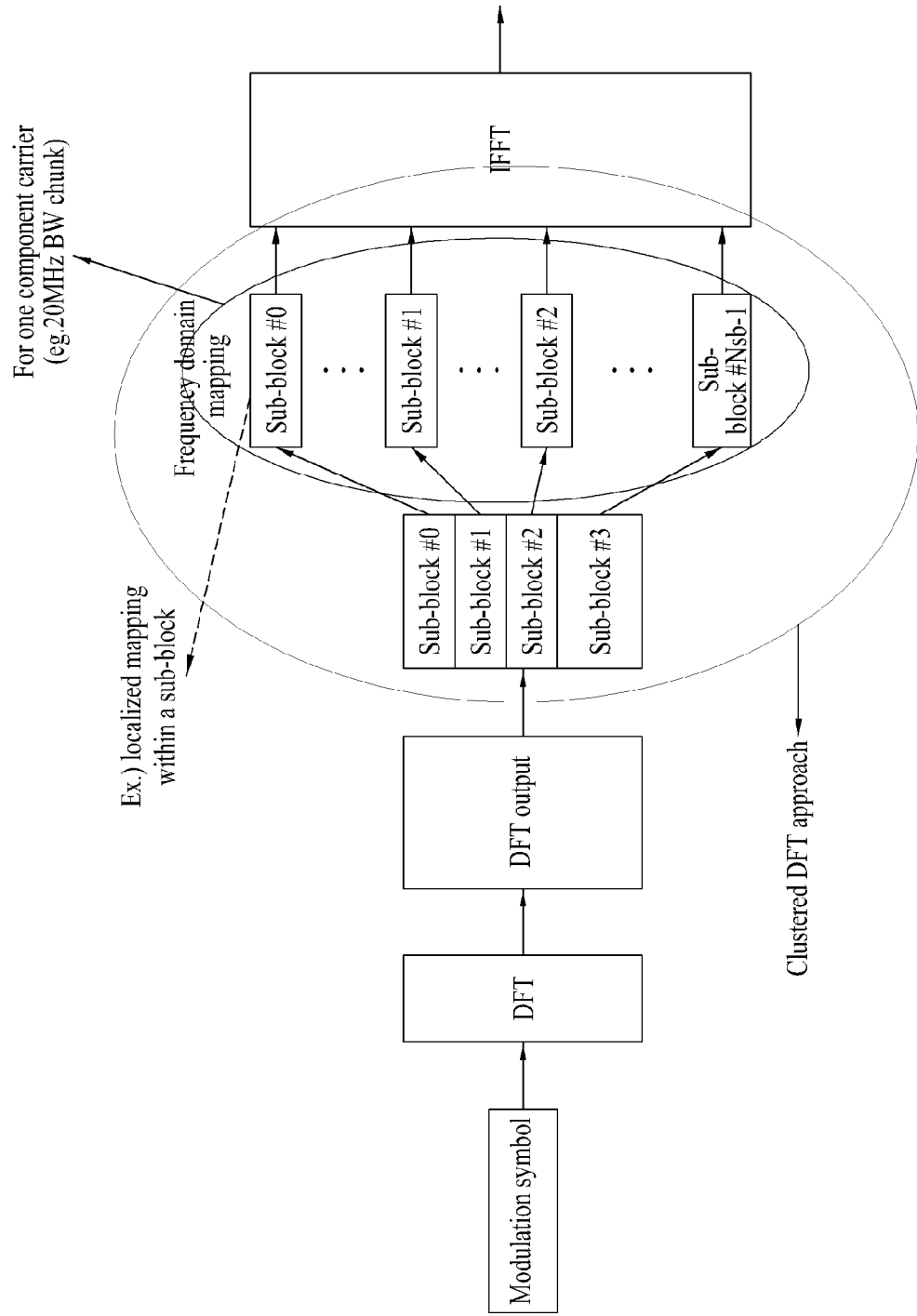
FIG. 6 is a diagram illustrating a signal processing procedure in which DFT process output samples are mapped into a single carrier in a clustered SC-FDMA according to one embodiment of the present invention.

FIG. 6 is a diagram illustrating a signal processing procedures for mapping DFT output samples into a single carrier in a clustered SC-FDMA according to one embodiment of the present invention. Also, FIG. 7 and FIG. 8 are diagrams illustrating a signal processing procedure for mapping DFT process output samples into multiple carriers in a clustered SC-FDMA according to one embodiment of the present invention.

Figure 7:
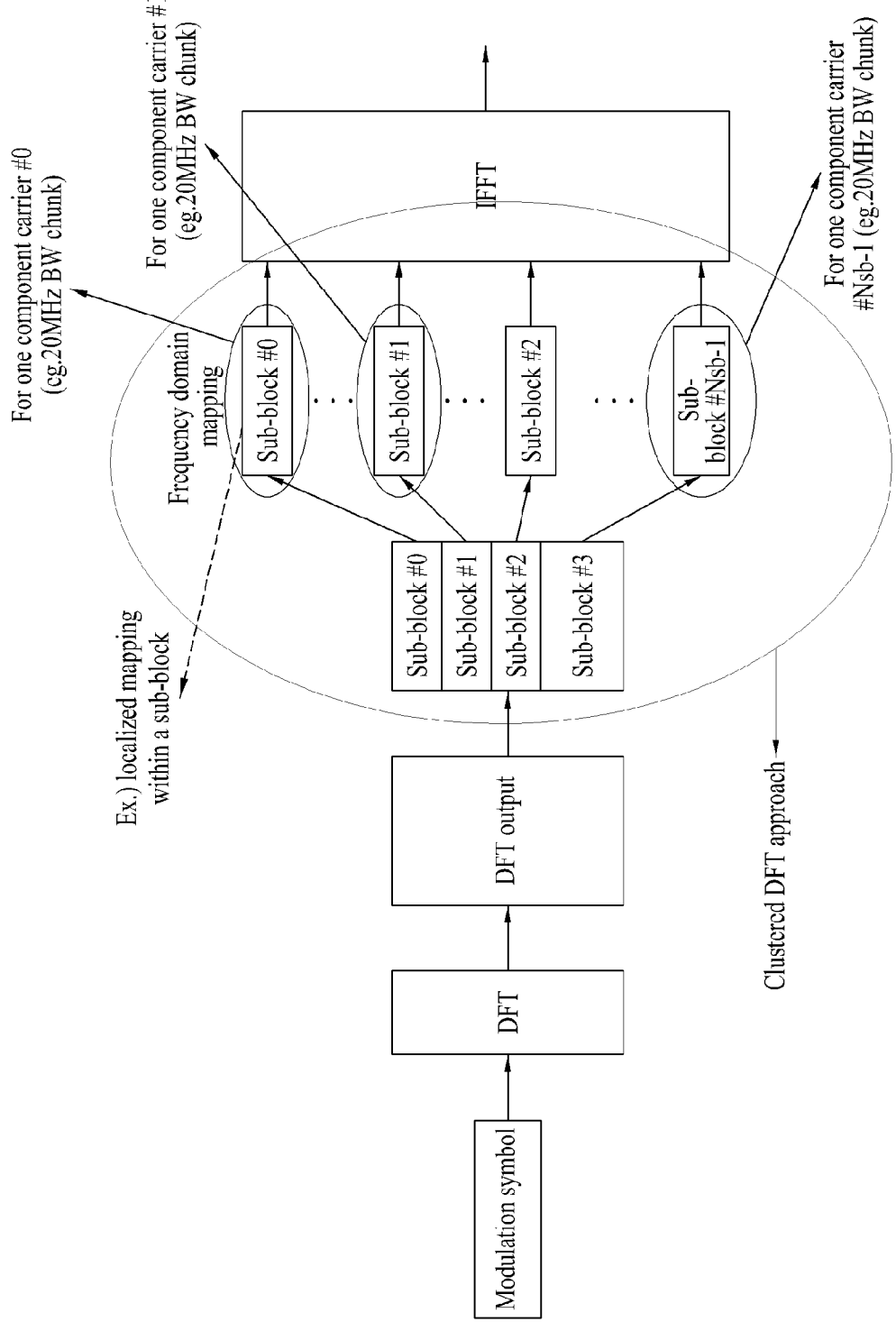
FIG. 7 and FIG. 8 are diagrams illustrating a signal processing procedure in which DFT process output samples are mapped into multiple carriers in a clustered SC-FDMA according to one embodiment of the present invention.
Figure 8:
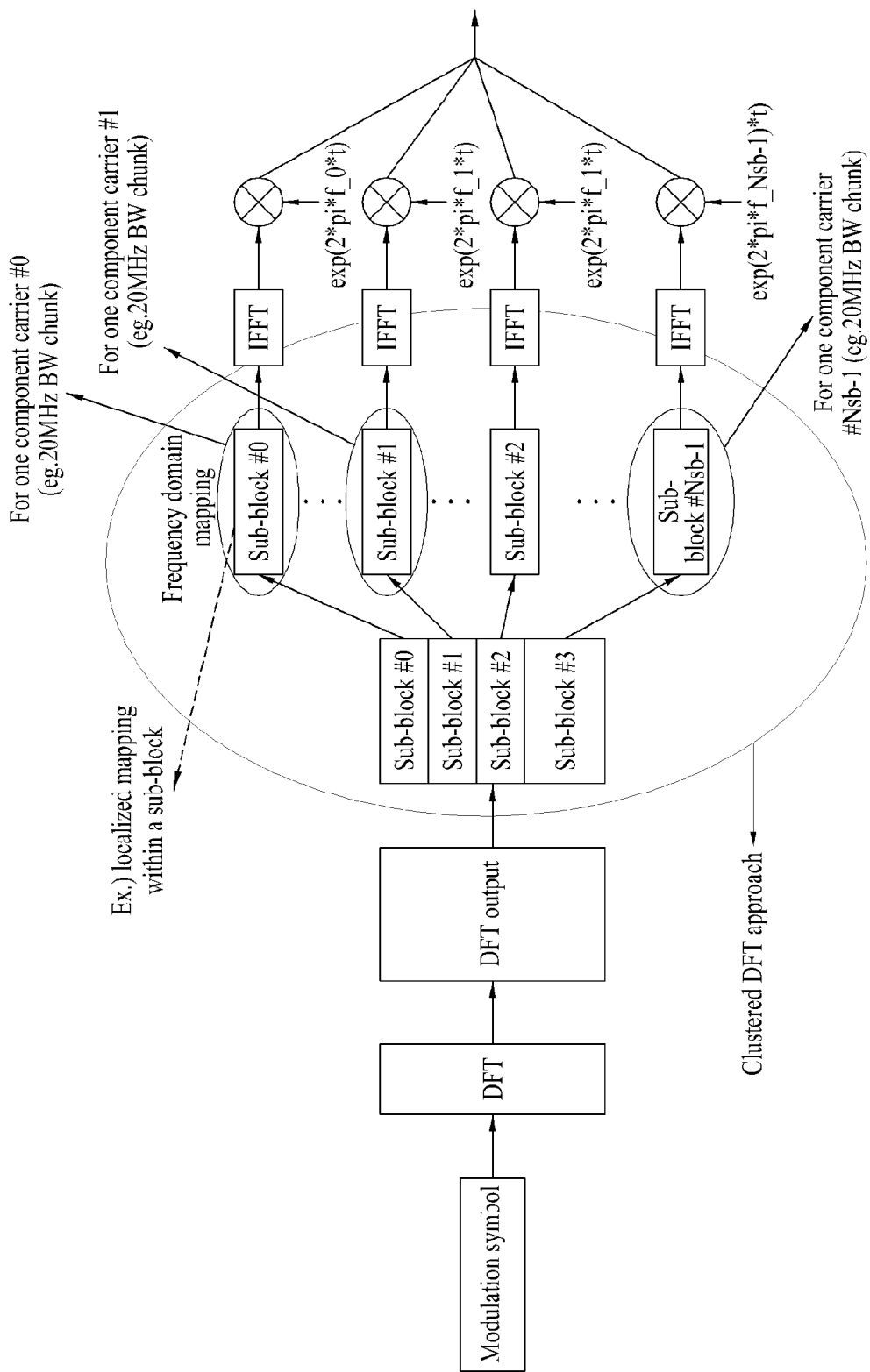

FIG. 6 illustrates an example that clustered SC-FDMA is used for intra-carrier, and FIG. 7 and FIG. 8 illustrate examples that clustered SC-FDMA is used for inter-carrier. Also, in FIG. 7, a signal is generated through a single IFFT block if subcarrier spacing is aligned between adjacent component carriers in a state that contiguous component carriers are allocated in a frequency domain. In FIG. 8, a signal is generated through a plurality of IFFT blocks as component carriers are not adjacent to one another in a state that non-contiguous component carriers are allocated in a frequency domain.

Figure 9:
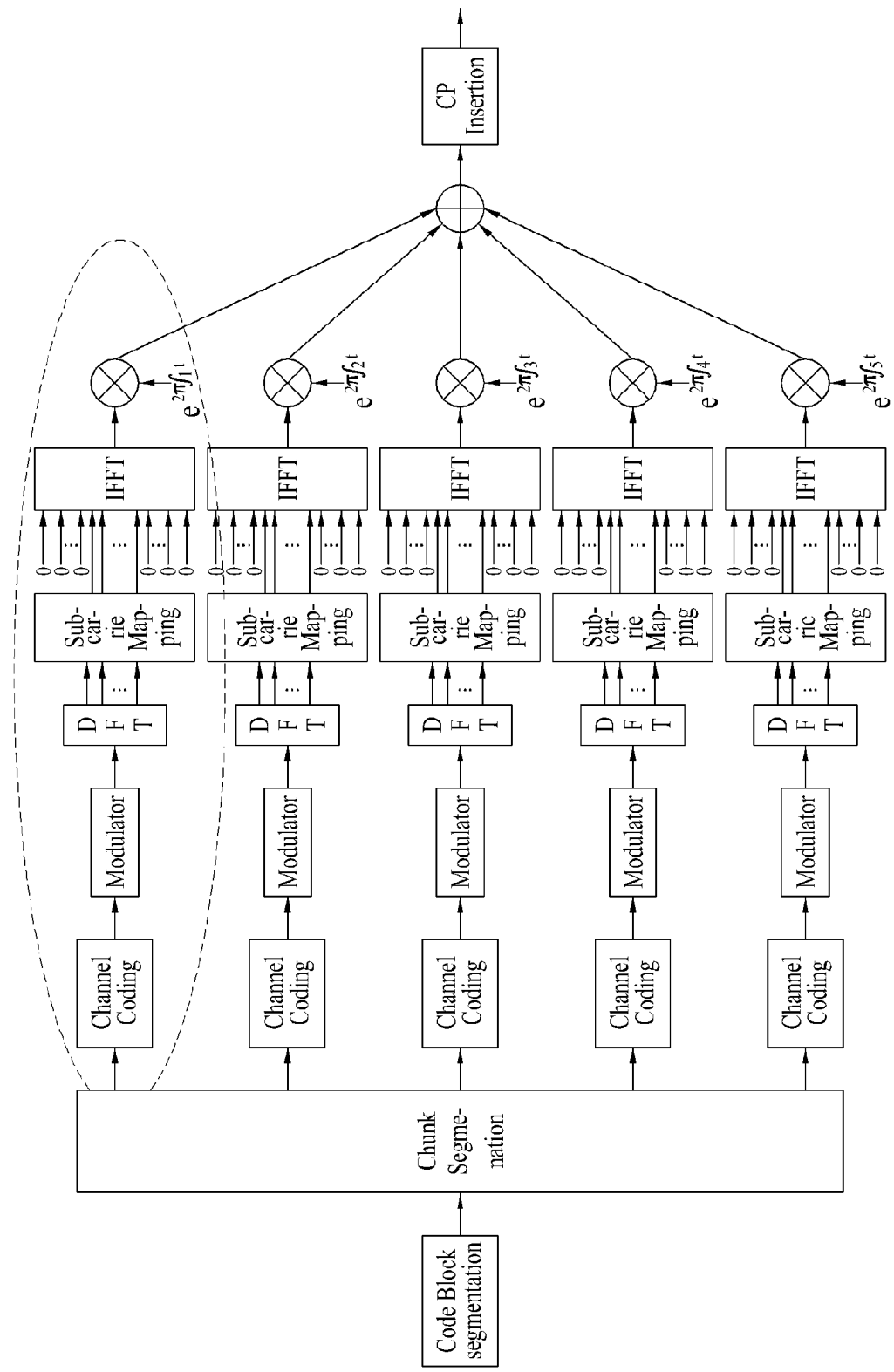
FIG. 9 is a diagram illustrating a signal processing procedure in segment SC-FDMA according to one embodiment of the present invention.

As a number of IFFTs equivalent to a random number of DFTs are used, DFT and IFFT have one-to-one correspondence relation, whereby DFT spreading of the existing SC-FDMA and frequency subcarrier mapping of IFFT are extended. In this case, N×SC-FDMA or N×DFT-s-OFDMA may be expressed. In the present invention, N×SC-FDMA or N×DFT-s-OFDMA may be referred to as segmented SC-FDMA. FIG. 9 is a diagram illustrating a signal processing procedure in segmented SC-FDMA system according to one embodiment of the present invention. As illustrated in FIG. 9, the segmented SC-FDMA system is characterized in that DFT process is performed in a group unit by grouping all time domain modulation symbols into N groups (N is an integer greater than 1) so as to relieve a condition of single carrier properties.

Figure 10:
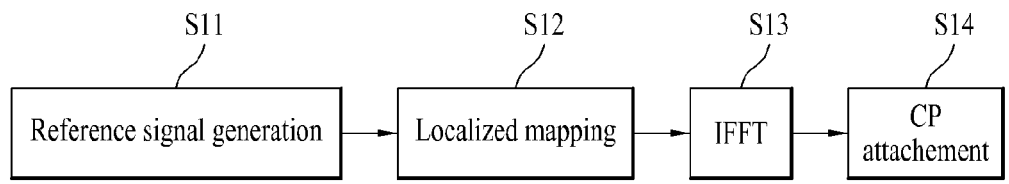
FIG. 10 is a diagram illustrating a signal processing procedure for transmitting a reference signal (RS) to an uplink.

FIG. 10 is a diagram illustrating a signal processing procedure for transmitting a reference signal (RS) to an uplink. As shown in FIG. 10, data are transmitted through IFFT after signals are generated in a time domain and then subjected to frequency mapping through a DFT precoder. On the other hand, after a reference signal (RS) is generated in a frequency domain (S11) without the process of the DFT precoder, the RS is transmitted after being sequentially subjected to localized mapping (S12), IFFT (S13), and cyclic prefix (CP) attachment processor (S14).

Figure 11:
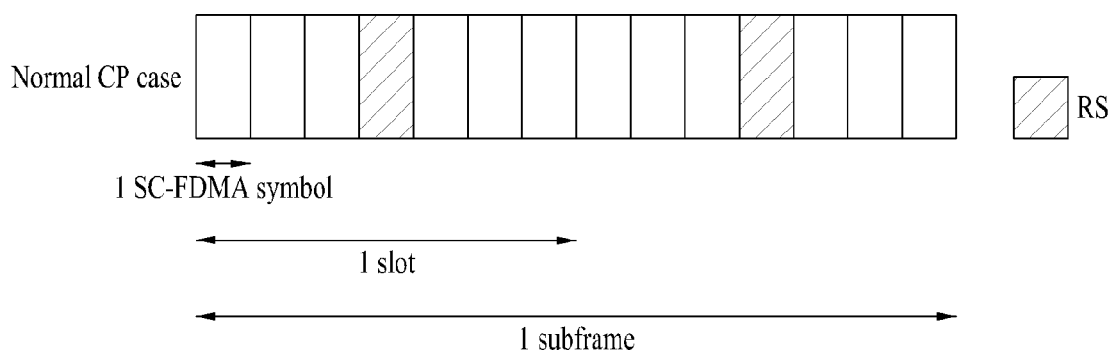
FIG. 11 is a diagram illustrating a structure of a subframe for transmitting a reference signal (RS) in case of normal cyclic prefix (CP)
Figure 12:
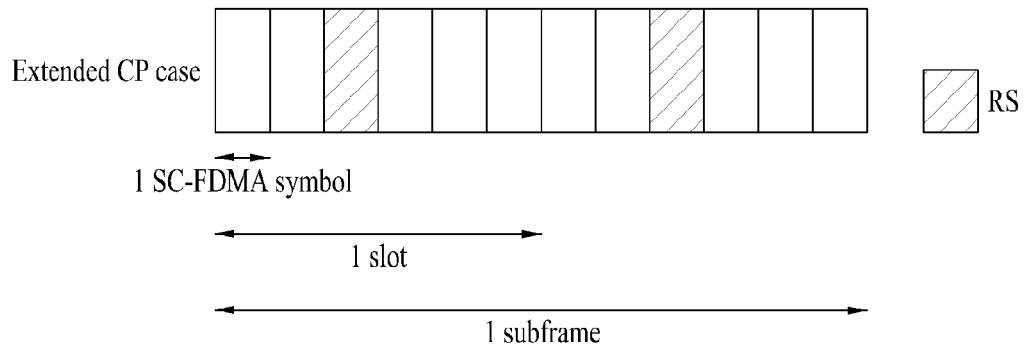
FIG. 12 is a diagram illustrating a structure of a subframe for transmitting a reference signal (RS) in case of extended cyclic prefix (CP)

FIG. 11 is a diagram illustrating a structure of a subframe for transmitting a reference signal (RS) in case of normal cyclic prefix (CP), and FIG. 12 is a diagram illustrating a structure of a subframe for transmitting a reference signal (RS) in case of extended cyclic prefix (CP). In FIG. 11, the RS is transmitted through the fourth and eleventh OFDM symbols. In FIG. 12, the RS is transmitted through the third and ninth OFDM symbols.

Figure 13:
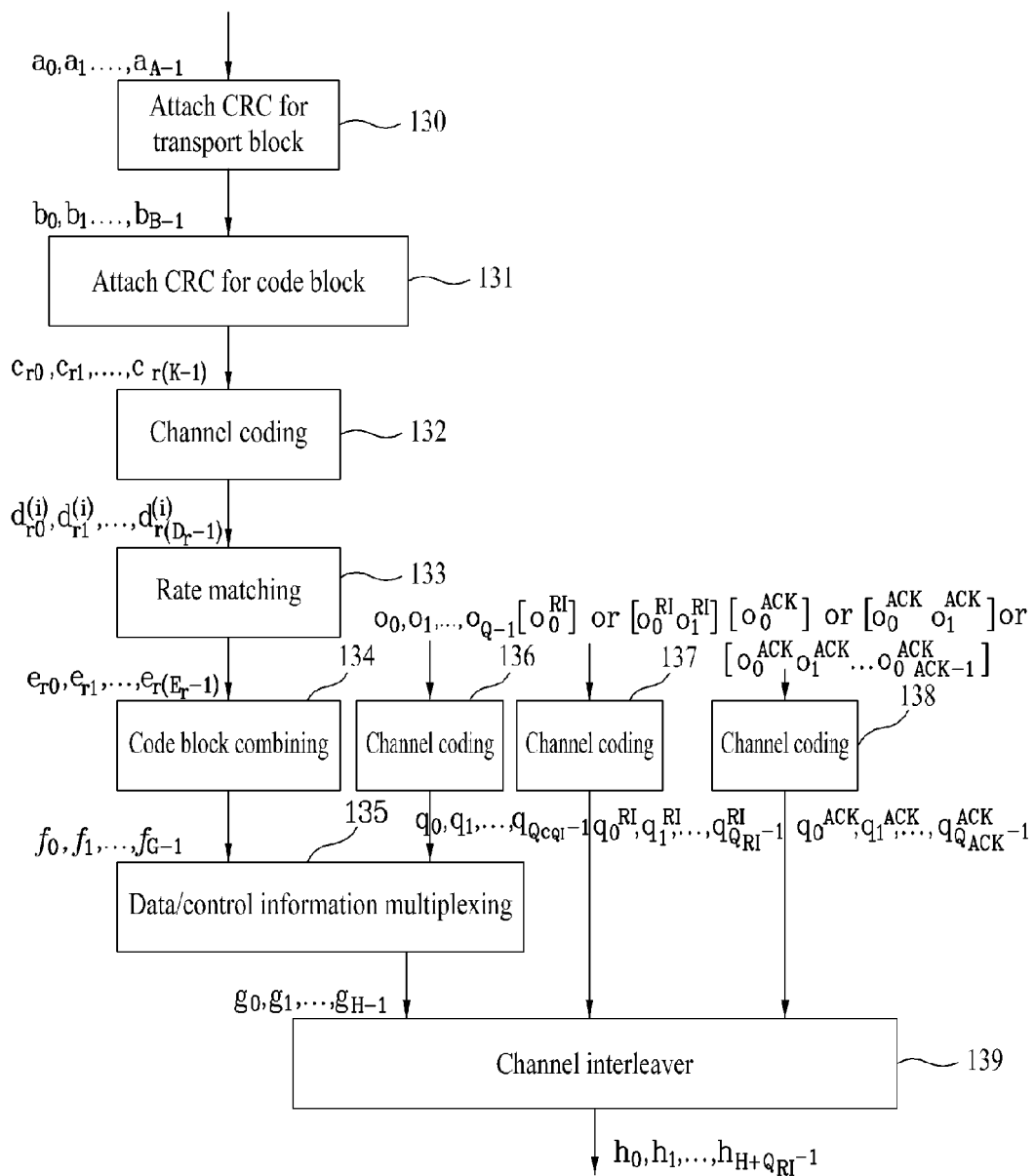
FIG. 13 is a block diagram illustrating a processing procedure of a transmission channel for an uplink shared channel.

Meanwhile, a processing structure of an uplink shared channel as a transmission channel will be described as follows. FIG. 13 is a block diagram illustrating a processing procedure of a transmission channel for an uplink shared channel. As shown in FIG. 13, after a cyclic redundancy check (CRC) for a transport block (TB) is attached to the transport block to be transmitted to the uplink (130), data information multiplexed together with control information are divided into several code blocks (CB) in accordance with the TB size, and CRC for CB is attached to the several CBs (131). Channel coding is performed for the above resultant value (132). Also, after the channel-coded data are subjected to rate matching (133), combination among the CBs is performed (134). In this way, the combined CBs are multiplexed with channel quality information/precoding matrix index (CQI/PMI) (135).

In the meantime, the CQI/PMI is channel coded separately from data (136). The channel coded CQI/PMI are multiplexed with the data (135).

Also, rank indication (RI) is channel coded separately from the data (137). Acknowledgement/negative acknowledgement (ACK/NACK) is channel-coded separately from the data, CQI/PMI and RI (138). The multiplexed data and CQI/PMI and the separately channel coded RI and ACK/NACK are channel interleaved, whereby output signals are generated (139).

Meanwhile, in the LTE uplink system, physical resource elements (RE) for control channel and data will be described.

Figure 14:
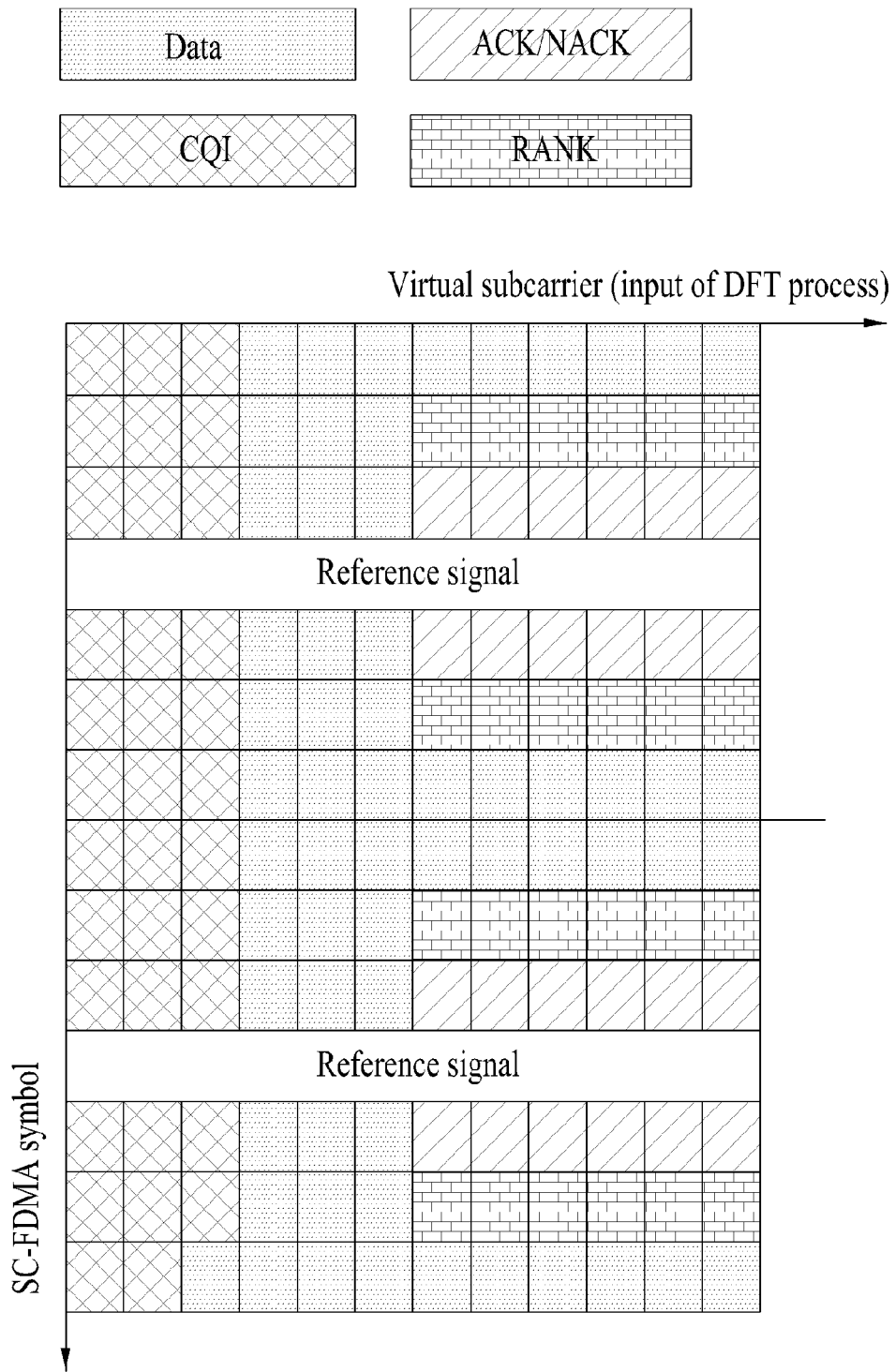
FIG. 14 is a diagram illustrating a method for mapping uplink data into physical resources for control channel transmission.

FIG. 14 is a diagram illustrating a method for mapping uplink data into physical resources for control channel transmission.

As shown in FIG. 14, CQI/PMI and data are mapped on the RE in accordance with a time-first mode. Encoded ACK/NACK is inserted near a demodulation reference signal (DM RS) through puncturing, and RI is mapped into RE next to RE where ACK/NACK is located. Resources for RI and ACK/NACK may occupy maximum four SC-FDMA symbols. If data and control information are simultaneously transmitted to an uplink shared channel, mapping may be performed in the order of RI, CQI/PMI, concatenation of data, and ACK/NACK. In other words, after RI is first mapped, CQI/PMI and concatenation of data are mapped into the other RE except for RE where RI is mapped in accordance with a time-first mode. ACK/NACK is mapped while puncturing the already mapped CQI/PMI and concatenation of data.

As described above, as uplink control information (UCI) such as CQI/PMI and data are multiplexed, single carrier properties may be satisfied. Accordingly, uplink transmission that maintains low cubic metric (CM) may be achieved.

In an advanced system (for example, LTE Rel-10) of the existing system, at least one of the SC-FDMA transmission system and the clustered DFTs OFDMA transmission system on each component carrier may be applied for uplink transmission to each user equipment together with uplink-MIMO (UL-MIMO) transmission.

Figure 15:
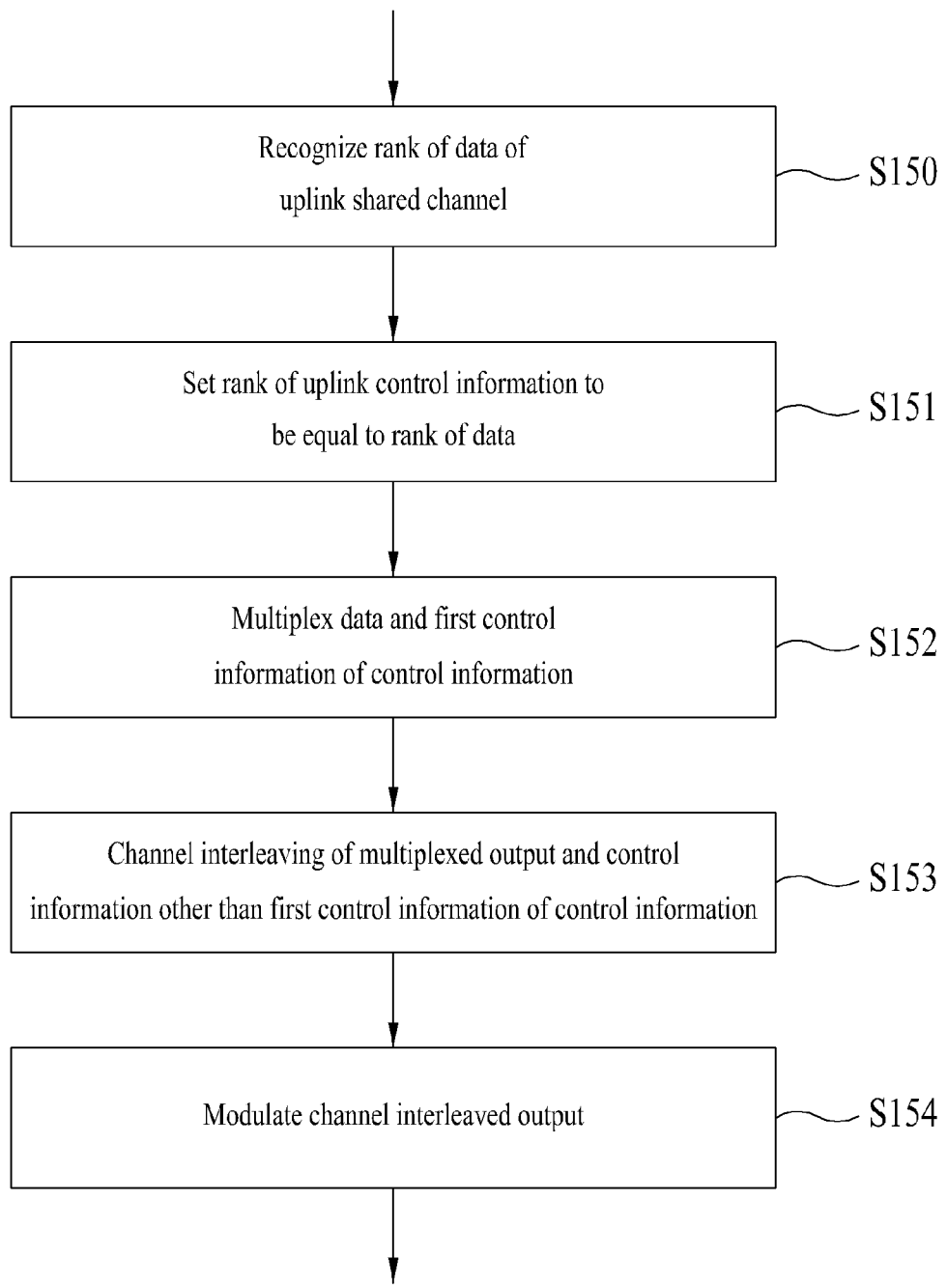
FIG. 15 is a flow chart illustrating a method for efficiently multiplexing data and a control channel on an uplink shared channel.

FIG. 15 is a flow chart illustrating a method for efficiently multiplexing data and a control channel on an uplink shared channel.

As shown in FIG. 15, the user equipment recognizes a rank for data of a physical uplink shared channel (PUSCH) (S150). Then, the user equipment sets a rank of an uplink control channel (which means uplink control information (UCI) such as CQI, ACK/NACK and RI) as the same rank that of the data (S151). Also, the user equipment multiplexes data and first control information, that is, CQI in a concatenated manner (S152). Then, after the user equipment maps RI into a designated RE and maps concatenated data into CQI in accordance with a time-first mode, it maps ACK/NACK by puncturing RE near the DM-RS, whereby channel interleaving may be performed (S153).

Afterwards, data and control channel may be modulated into QPSK, 16QAM, and 64QAM in accordance with MCS table (S154). At this time, the modulation step may be shifted to another step (for example, the modulation step may be performed before the multiplexing step of data and control channel). Also, channel interleaving may be performed in a unit of codeword or layer.

Figure 16:
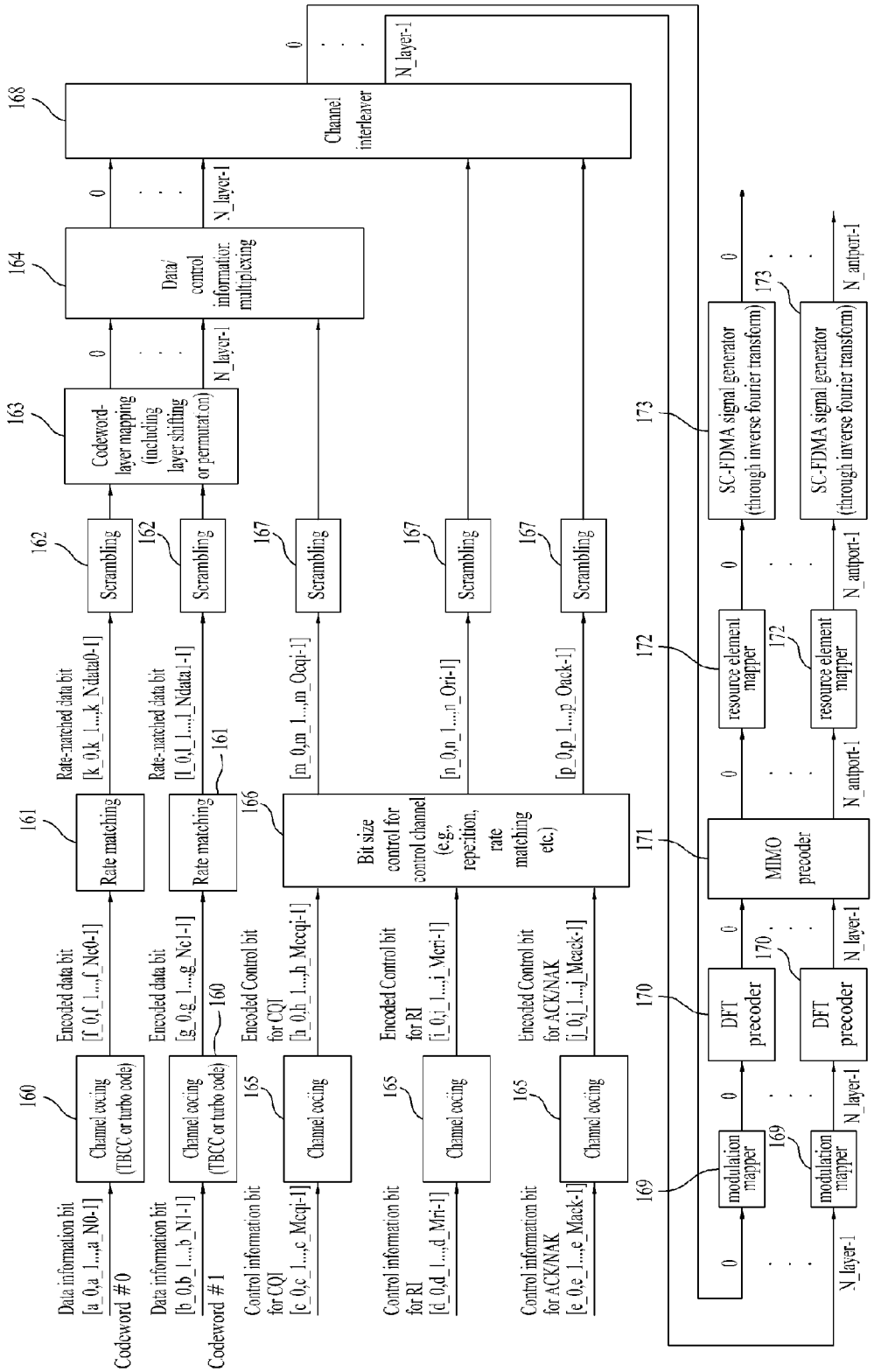
FIG. 16 is a block diagram illustrating a method for generating a transmission signal of a control channel and data.

FIG. 16 is a block diagram illustrating a method for generating a transmission signal of a control channel and data. Each block may be located depending on an application mode.

Supposing two codewords, channel coding is performed for each codeword (160), and rate matching is performed in accordance with a given MCS level and resource size (161). Then, encoded bits may be scrambled cell-specifically, user equipment-specifically, or codeword-specifically (162).

Afterwards, codeword-to-layer mapping is performed (163). In this case, an operation of layer shift or permutation may be included in this codeword-to-layer mapping.

Figure 17:
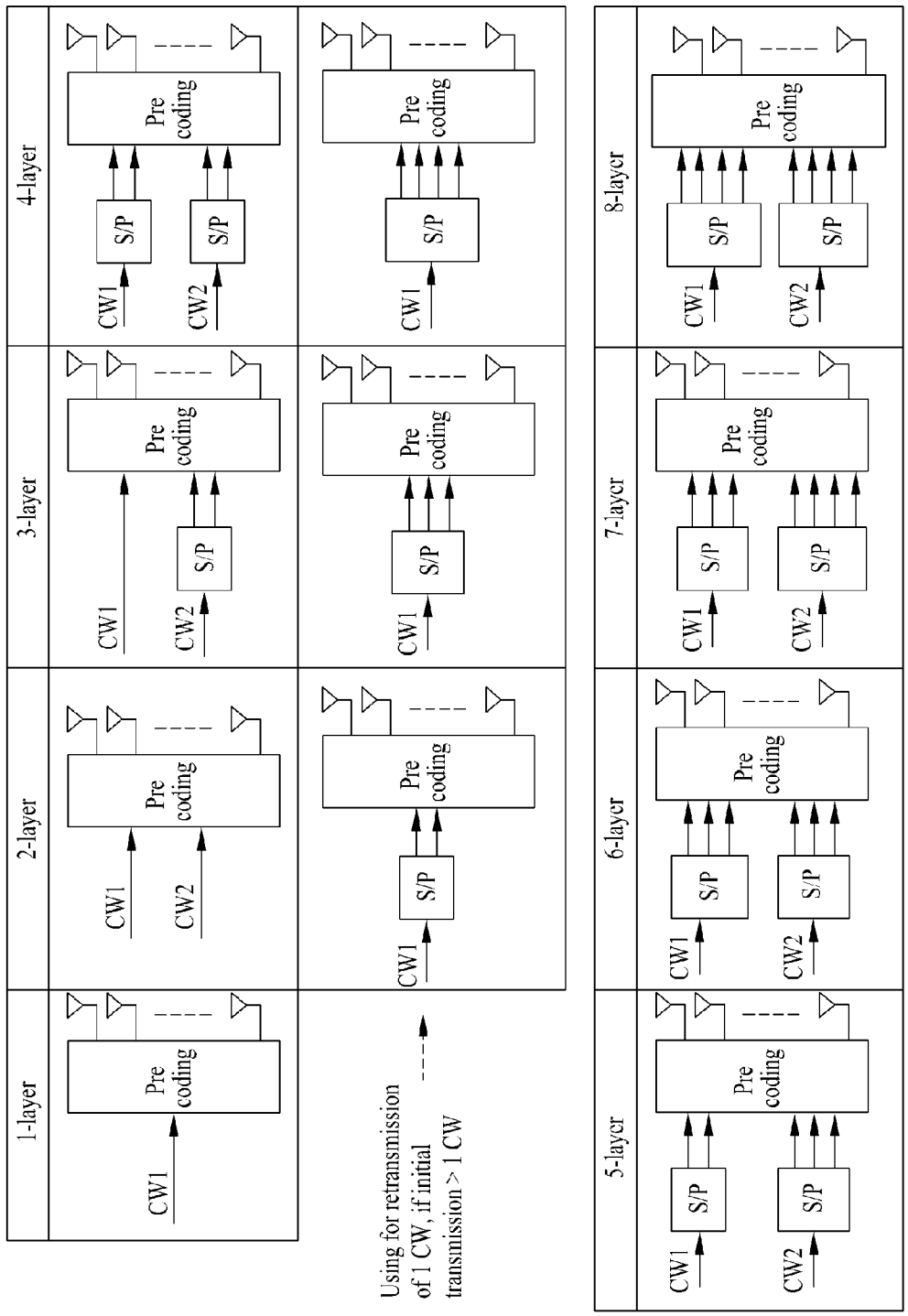
FIG. 17 is a diagram illustrating a codeword-to-layer mapping method.

FIG. 17 is a diagram illustrating a codeword-to-layer mapping method. The codeword-to-layer mapping may be performed using a rule shown in FIG. 17. In FIG. 17, a precoding location may be different from that in FIG. 13.

Control information such as CQI, RI and ACK/NACK is channel-coded in accordance with a given specification (165). At this time, CQI, RI and ACK/NACK may be encoded using the same channel code for all the codewords, or may be encoded using different channel codes for each of the codewords.

Then, the number of encoded bits may be varied by a bit size controller (166). The bit size controller may be unified with the channel coding block (165). The signal output from the bit size controller is scrambled (167). At this time, scrambling may be performed cell-specifically, layer-specifically, codeword-specifically or user equipment-specifically (UE-specifically).

The bit size controller may be operated as follows.

(1) The bit size controller recognizes rank of data for PUSCH (n_rank_pusch).

(2) Rank of a control channel (n_rank_control) is set to be the same as the data rank (that is, n_rank_control=n_rank_pusch), and the number (n_bit_ctrl) of bits for the control channel is extended by being multiplied by the rank of the control channel.

One method for the operation of the bit size controller is to simply and repeatedly copy the control channel. At this time, the control channel may be an information level before channel coding, or may be a coded bit level after channel coding. In other words, in case of the control channel [a0, a1, a2, a3] of n_bit_ctrl=4 and n_rank_pusch=2, the number (n_ext_ctrl) of extended bits may be 8 bits of [a0, a1, a2, a3, a0, a1, a2, a3].

If the bit size controller and the channel encoder are configured by one module, coded bits may be generated based on channel coding and rate matching, which are defined in the existing system (for example, LTE Rel-8).

In addition to the bit size controller, bit level interleaving may be performed to provide randomization per layer. Alternatively, interleaving may be performed at a modulation symbol level equivalently to bit level interleaving.

CQI/PMI channel and data for two codewords may be multiplexed by a data/control multiplexer (164). Then, the channel interleaver maps CQI/PMI in accordance with the time-first mapping mode while mapping ACK/NACK information at both slots into RE near uplink DM-RS within the subframe (168).

And, modulation is performed for each layer (169), and DFT precoding (170), MIMO precoding (171) and RE mapping (172) are sequentially performed. Then, SC-FDMA signal is generated and then transmitted through an antenna port (173).

The above functional blocks are not limited to the location shown in FIG. 16, and their locations may be varied as the case may be. For example, the scrambling blocks 162 and 167 may be located next to the channel interleaving block. Also, the codeword-to-layer mapping block 163 may be located next to the channel interleaving block 168 or the modulation mapper block 169.

In the meantime, if the uplink control information UCI is coped and mapped into a plurality of layers, a method how to set a modulation order has not been defined. Accordingly, the present invention suggests a method for setting a modulation order if UCI is repeated and mapped into all or some of codewords (or layers). Although the present invention may be applied to the case where the number of codewords (or layers) is N, for convenience of description, the present invention is limited to the case where UCI is mapped into two codewords (or layers).

(1) First of all, the modulation order of the UCI may follow the same as that of a specific codeword designated by the base station. At this time, the specific codeword designated by the base station may be varied per uplink transmission. For example, if ACK/NACK (or RI) is repeated and mapped into the first codeword and the second codeword, the first codeword may be designated by the base station at the nth uplink transmission, and ACK/NACK (or RI) may use the modulation order configured for the first codeword. Also, at the n+1th uplink transmission, the base station may designate the second codeword, and ACK/NACK (or RI) may use the modulation order configured for the second codeword.

(2) A modulation order of a specific codeword requested or notified from the user equipment to the base station at the previous uplink transmission may be used as the modulation order of the UCI. It is preferable that request or notification of the specific codeword designated by the user equipment is performed for uplink transmission prior to transmission of the UCI. For example, if ACK/NACK (or RI) is repeated and mapped into the first codeword and the second codeword, the user equipment may designate the first codeword at the nth uplink transmission, and may use the modulation order configured for the first codeword with respect to the ACK/NACK (or RI).

(3) The highest modulation order of modulation orders of codewords into which the UCI is repeated and mapped may be used as the modulation order of the UCI. For example, if the modulation order of the first codeword is higher than that of the second codeword, the modulation order of the first codeword is used for the ACK/NACK (or RI).

(4) The lowest modulation order of modulation orders of codewords into which the UCI is repeated and mapped may be used as the modulation order of the UCI. For example, if the modulation order of the first codeword is lower than that of the second codeword, the modulation order of the first codeword is used for the ACK/NACK (or RI).

A modulation order of a codeword of the last index or start index among codewords into which the UCI is repeated and mapped may be considered as the modulation order of the UCI. For example, if the ACK/NACK (or RI) is repeated and mapped into the first codeword and the second codeword, the modulation order of the second codeword which is the codeword of the last index is used for the ACK/NACK (or RI).

(6) If some of the UCI is mapped into the specific codeword and the other UCI is repeated and mapped into all the codewords, the modulation order of the specific codeword into which some of the UCI is mapped may be used as the modulation order of the UCI. For example, if CQI is mapped into the first codeword only and ACK/NACK (or RI) is repeated and mapped into both the first codeword and the second codeword, the modulation order of the first codeword into which CQI is mapped is used as the modulation order of the ACK/NACK (or RI). Of course, the modulation order of the first codeword is also used as the modulation order of CQI.

(7) If some of the UCI is mapped into the specific codeword and the other UCI is repeated and mapped into all the codewords, the modulation order of the codeword into which some of the UCI is not mapped may be used as the modulation order of the UCI. For example, if CQI is mapped into the first codeword only and ACK/NACK (or RI) is repeated and mapped into both the first codeword and the second codeword, the modulation order of the second codeword into which CQI is not mapped is used as the modulation order of the ACK/NACK (or RI).

(8) A fixed modulation order which is previously set may be considered as the modulation order of the UCI. In other words, if CQI, ACK/NACK and RI are transmitted at the same time, the CQI may be modulated into 64QAM, the ACK/NACK may be modulated into 16QAM, and RI may be modulated into QPSK regardless of the modulation order of the codeword. In more detail, the modulation order configured for the UCI may be set separately per UCI. Alternatively, the same modulation order may be applied to all kinds of UCI.

(9) Even in case of the same UCI, different modulation orders may be configured for the same UCI depending on a specific condition. In other words, if the sizes of the ACK/NACK and RI are within 2 bits, coding may be performed using four edges only on the constellation to obtain constellation image such as QPSK. However, if the sizes of the ACK/NACK and RI are more than 3 bits, Reed-Muller (RM) coding may be performed in such a manner that coding is performed by constellation such as data. In this case, if constellation image such as QPSK is used using four edges only on the constellation, the higher the modulation order is, the robuster transmission is performed. However, in case of constellation such as data using RM coding, the lower the modulation order is, the robuster transmission is performed. Accordingly, in case of the ACK/NACK (or RI), the modulation order may be set differently depending on the information bit size prior to coding, coding types, or what point on the constellation is used.

Figure 18:
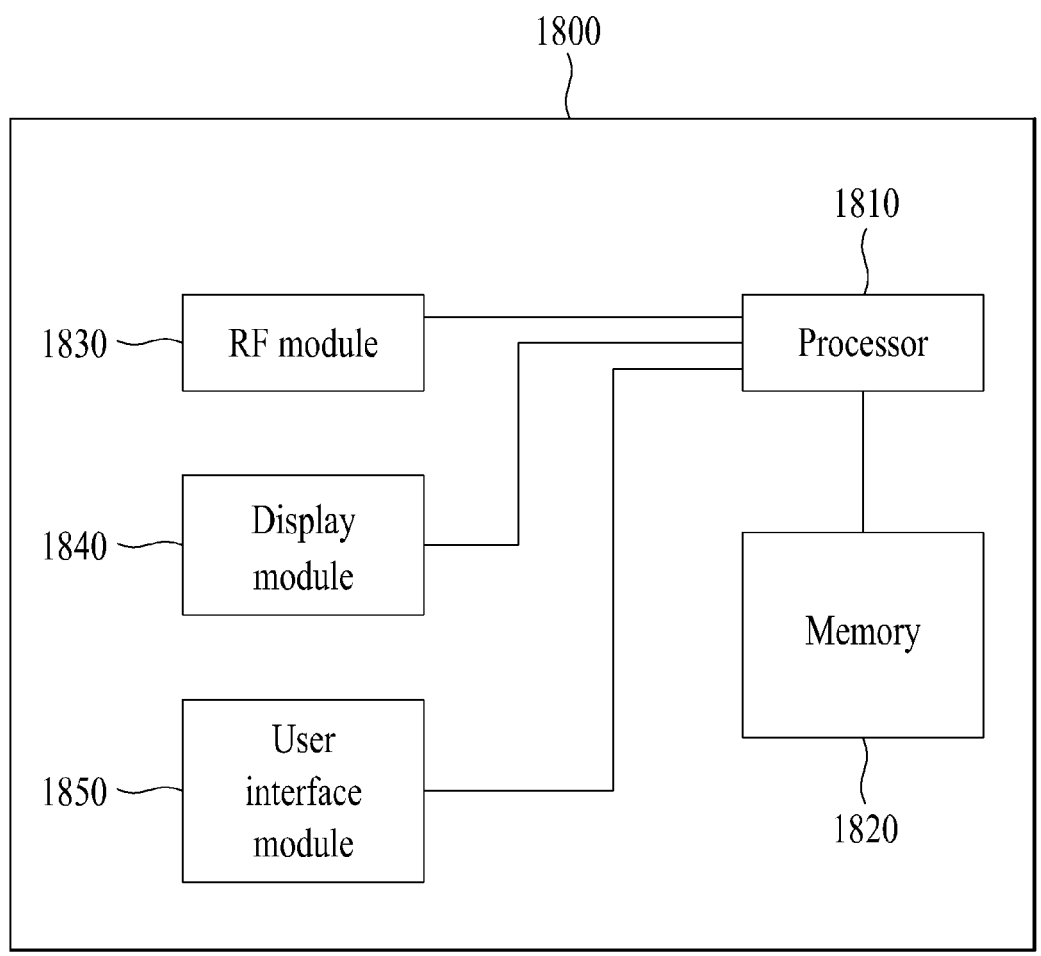
FIG. 18 is a block diagram illustrating a communication apparatus according to one embodiment of the present invention.

FIG. 18 is a block diagram illustrating a communication apparatus according to one embodiment of the present invention.

Referring to FIG. 18, the communication apparatus 1800 includes a processor 1810, a memory 1820, a radio frequency (RF) module 1830, a display module 1840, and a user interface module 1850.

The communication apparatus 1800 is illustrated for convenience of description, and some of its modules may be omitted. Also, the communication apparatus 1800 may further include necessary modules. Moreover, some modules of the communication apparatus 1800 may be divided into segmented modules. The processor 1810 is configured to perform the operation according to the embodiment of the present invention illustrated with reference to the drawings. In more detail, a detailed operation of the processor 1810 will be understood with reference to the disclosure described with reference to FIG. 1 to FIG. 17.

The memory 1820 is connected with the processor 1810 and stores an operating system, an application, a program code, and data therein. The RF module 1830 is connected with the processor 1810 and converts a baseband signal to a radio signal or vice versa. To this end, the RF module 1830 performs analog conversion, amplification, filtering and frequency uplink conversion, or their reverse processes. The display module 1840 is connected with the processor 1810 and displays various kinds of information. Examples of the display module 1840 include, but not limited to, a liquid crystal display (LCD), a light emitting diode (LED), and an organic light emitting diode (OLED). The user interface module 1850 is connected with the processor 1810, and may be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention may be applied to a wireless communication system. In more detail, the present invention may be applied to a wireless mobile communication apparatus used for a cellular system.

The invention claimed is:

1. A method for transmitting uplink control information from a user equipment having multiple antennas in a wireless communication system, the method comprising:
generating a plurality of codewords by using data information and the uplink control information;
modulating each of the generated codewords; and
transmitting the modulated signals to a base station through the multiple antennas,
wherein first uplink control information of the uplink control information is mapped into a specific one of the plurality of codewords, and second uplink control information is repeated and mapped for each of the plurality of codewords,
wherein a modulation order for the first uplink control information is determined according to predetermined modulation orders,
wherein a modulation order for the second uplink control information is determined based on comparing bit size prior to coding the second uplink control information with a predetermined value, and
wherein the predetermined value is determined based on a type of the second uplink control information.

2. The method according to claim 1, wherein the predetermined modulation orders are configured by the base station for data information included, in each of the codewords.

3. The method according to claim 1, wherein the first uplink control information is a channel quality indicator (CQI).

4. The method according to claim 1, wherein the second uplink control information is at least one of an acknowledgement/negative acknowledgement (ACK/NACK) and a rank indicator (RI).

5. The method according to claim 4, wherein:
when the second uplink control information corresponds to the ACK/NACK, the predetermined value is 3 bits, and
when the second uplink control information corresponds to the RI, the predetermined value is 4 bits.

6. The method according to claim 1, wherein:
if the bit size is below the predetermined value, the modulation order for the second uplink control information is determined as a lowest order of predetermined modulation orders, and
if the bit size is more than the predetermined value, the modulation order for the second uplink control information is determined as a highest order of predetermined modulation orders.

7. A user equipment having multiple antennas in a wireless communication system, the user equipment comprising:
a wireless communication module configured to transmit and receive a signal to and from a base station by using multiple antennas; and
a processor configured to process the signal, generate a plurality of codewords by using data information and uplink control information, and modulate each of the generated codewords,
wherein a channel quality indicator (CQI) of the uplink control information is mapped into a specific one of the plurality of codewords, and an acknowledgement/negative acknowledgement (ACK/NACK) or a rank indicator (RI) of the uplink control information is repeated and mapped for each of the plurality of codewords, wherein a modulation order for the CQI is determined according to predetermined modulation orders, wherein a modulation order for the ACK/NACK or the RI is determined based on comparing bit size prior to coding the ACK/NACK or the RI with a predetermined value, and wherein the predetermined value is determined based on a type of the ACK/NACK or the RI.

8. The user equipment according to claim 7, wherein the predetermined modulation orders are configured by the base station for data information included in each of the codewords.

9. The user equipment according to claim 7, wherein:

if the bit size is below the predetermined value, the modulation order for the ACK/NACK or the RI is determined as a lowest order of predetermined modulation orders, and if the bit size is more than the predetermined value, the modulation order for the ACK/NACK or the RI is determined as a highest order of predetermined modulation orders.

10. A user equipment having multiple antennas in a wireless communication system, the user equipment comprising:

a wireless communication module for transmitting and receiving a signal to and from a base station by using multiple antennas; and a processor configured to process the signal, generate a plurality of codewords by using data information and uplink control information, and modulate each of the generated codewords, wherein first uplink control information of the uplink control information is mapped into a specific one of the plurality of codewords, and second uplink control information of the uplink control information is repeated and mapped for each of the plurality of codewords, wherein a modulation order for the first uplink control information is determined according to predetermined modulation orders, wherein a modulation order for the second uplink control information is determined based on comparing bit size prior to coding the second uplink control information with a predetermined value, and wherein the predetermined value is determined based on a type of the second uplink control information.

11. The user equipment according to claim 10, wherein the predetermined modulation orders are configured by the base station for data information included in each of the codewords.

12. The user equipment according to claim 10, wherein the first uplink control information is a channel quality indicator (CQI).

13. The user equipment according to claim 10, wherein the second uplink control information is either an acknowledgement/negative acknowledgement (ACK/NACK) or a rank indicator (RI).

14. The user equipment according to claim 13, wherein:

when the second uplink control information corresponds to the ACK/NACK, the predetermined value is 3 bits; and when the second uplink control information corresponds to the RI, the predetermined value is 4 bits.

15. The user equipment according to claim 10, wherein:

when the second uplink control information corresponds to the ACK/NACK, the predetermined value is 3, and when the second uplink control information corresponds to the RI, the predetermined value is 4 bits.

16. The user equipment according to claim 11, wherein:

if the bit size is below the predetermined value, the modulation order for the second uplink control information is determined as a lowest order of predetermined modulation orders, and if the bit size is more than the predetermined value, the modulation order for the second uplink control information is determined as a highest order of predetermined modulation orders.

* * * * *